(12) United States Patent
Lee (10) Patent No.: US 9,428,071 B2
(45) Date of Patent: Aug. 30, 2016

(54) IMPEDANCE BASED BATTERY PARAMETER ESTIMATION

(71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 14/154,854

(22) Filed: Jan. 14, 2014

(65) Prior Publication Data

US 2015/0197159 A1    Jul. 16, 2015

(51) Int. Cl.
| B60L 11/00 | (2006.01) |
| B60W 20/00 | (2016.01) |
| B60L 3/00 | (2006.01) |
| B60L 7/00 | (2006.01) |
| B60L 11/18 | (2006.01) |
| B60L 3/04 | (2006.01) |
| B60L 3/12 | (2006.01) |
| B60L 7/14 | (2006.01) |
| B60L 11/14 | (2006.01) |

(52) U.S. Cl.
CPC .......... *B60L 11/1851* (2013.01); *B60L 3/0046* (2013.01); *B60L 3/04* (2013.01); *B60L 3/12* (2013.01); *B60L 7/14* (2013.01); *B60L 11/14* (2013.01); *B60L 11/1859* (2013.01); *B60L 11/1861* (2013.01); *B60L 11/1864* (2013.01); *B60L 11/1868* (2013.01); *B60L 11/1877* (2013.01); *B60W 20/00* (2013.01); *B60L 2210/10* (2013.01); *B60L 2210/40* (2013.01); *B60L 2240/545* (2013.01); *B60L 2240/547* (2013.01); *B60L 2240/549* (2013.01); *B60L 2240/80* (2013.01); *B60L 2260/44* (2013.01); *Y02T 10/70* (2013.01); *Y02T 10/7005* (2013.01); *Y02T 10/7044* (2013.01); *Y02T 10/7061* (2013.01); *Y02T 10/7066* (2013.01); *Y02T 10/7077* (2013.01); *Y02T 10/7216* (2013.01); *Y02T 10/7241* (2013.01); *Y10S 903/903* (2013.01)

(58) Field of Classification Search
None
See application file for complete search history.

(56) References Cited

U.S. PATENT DOCUMENTS

| 6,160,382 A | 12/2000 | Yoon et al. |
| 7,847,557 B2 | 12/2010 | Yun et al. |
| 2006/0068272 A1* | 3/2006 | Takami ................ B60L 3/0046 |
| | | 429/62 |

(Continued)

FOREIGN PATENT DOCUMENTS

| JP | 2000009817 A | 1/2000 |
| WO | 03093849 A1 | 11/2003 |

OTHER PUBLICATIONS

J. L. Morrison et al., Real Time Estimation of Battery Impedance, IEEEAC paper #1461, Revision 5, Updated Dec. 8, 2005, 13 pages.

*Primary Examiner* — Rami Khatib
*Assistant Examiner* — Jeffrey Boomer
(74) *Attorney, Agent, or Firm* — David B. Kelley; Brooks Kushman P.C.

(57) ABSTRACT

A hybrid powertrain system includes a battery cell and at least one controller programmed to output an average internal resistance of the cell for a sliding window time period. A mean electrical impedance is calculated by the controller based on a quotient of a Fast Fourier Transform (FFT) of a voltage output by the cell and a FFT of current input to the cell. An average internal resistance is calculated by the controller based on the mean electrical impedance. The controller may further control the cell according to the average internal resistance.

9 Claims, 5 Drawing Sheets

(56) References Cited

U.S. PATENT DOCUMENTS

| | | | |
|---|---|---|---|
| 2011/0031048 A1* | 2/2011 | Ohkura | 180/65.1 |
| 2011/0227587 A1 | 9/2011 | Nakanishi et al. | |
| 2012/0007556 A1* | 1/2012 | Matsui | G01R 31/3651 320/112 |
| 2012/0181875 A1* | 7/2012 | Wechlin | B60L 3/00 307/104 |
| 2012/0187773 A1* | 7/2012 | Wechlin | B60L 11/182 307/104 |
| 2013/0030737 A1* | 1/2013 | Okada | 702/63 |

* cited by examiner

IMPEDANCE BASED BATTERY PARAMETER ESTIMATION

TECHNICAL FIELD

The present disclosure relates to battery management techniques capable of estimating parameters of elements forming a battery model for providing control of an associated battery.

BACKGROUND

Hybrid electric vehicles (HEV) utilize a combination of an internal combustion engine with an electric motor to provide motive power. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or in other cases such as when the battery state of charge (SOC) drops below a certain level, the engine must start quickly and smoothly in a manner that is nearly transparent to the driver.

The HEV includes a battery management system that estimates values descriptive of the battery pack and/or battery cell present operating conditions. The battery pack and/or cell operating conditions include battery SOC, power fade, capacity fade, and instantaneous available power. The battery management system should be capable of estimating values during changing cell characteristics as cells age over the lifetime of the pack. For example, the calculation of power capability for a battery system may help prevent battery damage and/or other failure modes caused by overcharging and over-discharging. The precise estimation of some parameters will improve performance and robustness, and will ultimately lengthen the useful lifetime of the battery pack.

SUMMARY

A hybrid powertrain system includes a battery cell and at least one controller. The at least one controller outputs a mean electrical impedance of the cell for a sliding window time period based on a quotient of a Fast Fourier Transform (FFT) of voltage output by the cell and a FFT of current input to the cell. The at least one controller further controls operation of the cell according to the mean electrical impedance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
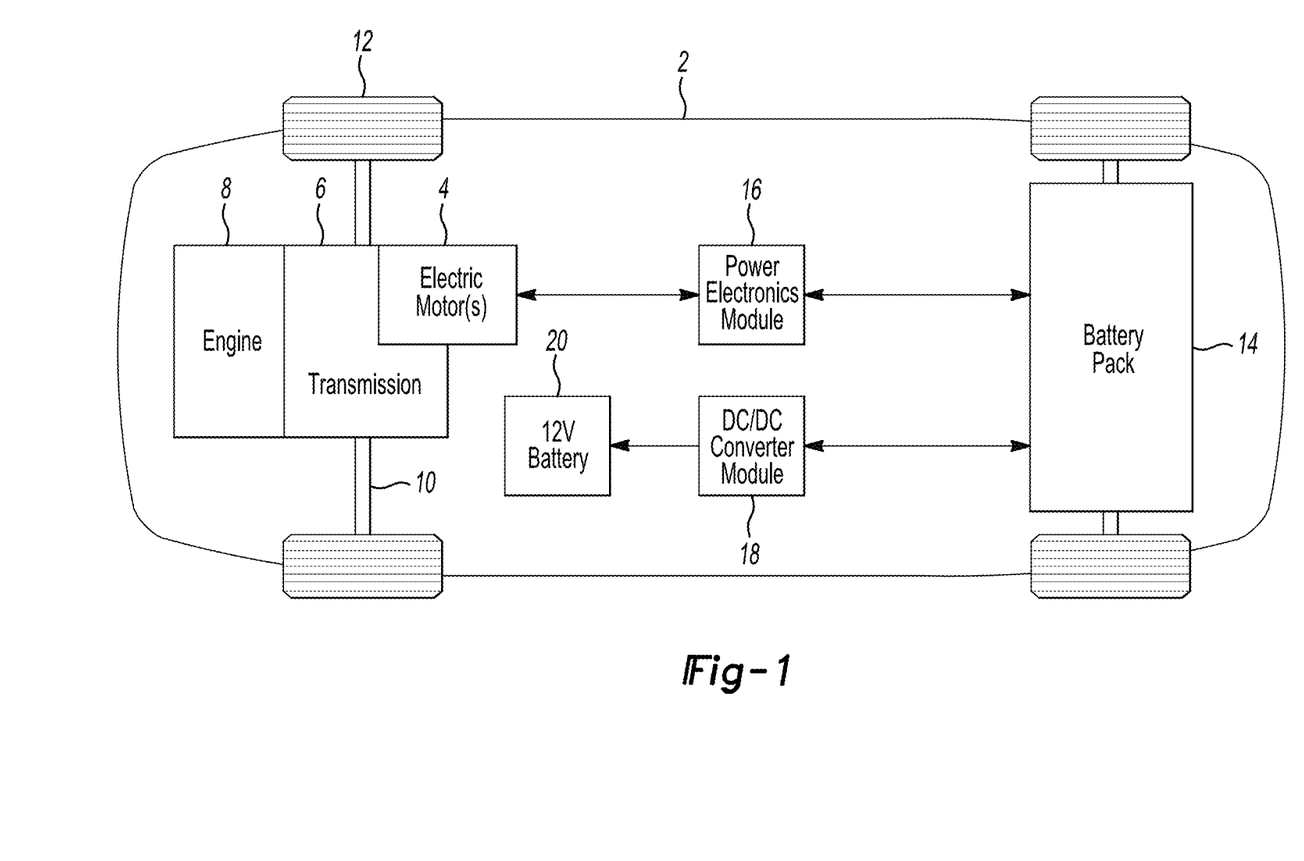
FIG. 1 is a schematic diagram of a hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 is also mechanically connected to a drive shaft 10 that is mechanically connected to the wheels 12. In another embodiment not depicted in the illustration, the hybrid transmission may be a non-selectable gear transmission that may include at least one electric machine. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 may include one or more battery cells that store energy which can be used by the electric motors 4. A vehicle battery pack 14 typically provides a high voltage DC output. The battery pack 14 is electrically connected to the power electronics module 16. The power electronics module may include one or more control modules that make up a vehicle computing system. The vehicle computing system may control several vehicle features, systems, and/or subsystems. The one or more modules may include, but are not limited to, a battery management system. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require three-phase AC current to function. The power electronics module 16 may convert the DC voltage to three-phase AC current as required by the electric motors 4. In a regenerative mode, the power electronics module 16 will convert the three-phase AC current from the electric motors 4 acting as generators to the DC voltage required by the battery pack 14.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

The battery pack may be controlled by the vehicle computing system using one or more control modules. The one or more control modules may include, but are not limited to, a battery control module. The one or more control modules may be calibrated to control the battery pack using battery model parameter estimation methods which include an average sense of effective battery internal resistance during operation to calculate/determine battery power capability. The power capability prediction enables the battery pack to prevent over-charging and over-discharging which could lead to reducing the life of the battery, performance issues with the vehicle powertrain, etc.

The calibration to control the battery pack may be accomplished using multiple tables to capture a wide frequency range that affects the impedance of the battery pack and its correlating dynamics. To populate/calibrate the multiple tables requires rigorous execution of offline testing of the battery pack in a test facility using complex algorithms. An example of offline testing of a battery pack is the Electrochemical Impedance Spectroscope (EIS) which may be implemented to capture the battery system characterization over wide frequency ranges that may include battery temperature, battery state of charge, and/or battery usage.

A vehicle battery measurement method may be implemented to eliminate the need of extensive offline testing. The vehicle battery measurement method may use one or more simple equivalent circuits to measure the battery pack in the vehicle to obtain the electrochemical impedance during operation. The vehicle battery measurement method may have a higher level of noise compared to EIS, however it may provide valuable information for characterizing the battery transient behavior during vehicle operation.

Figure 2A:
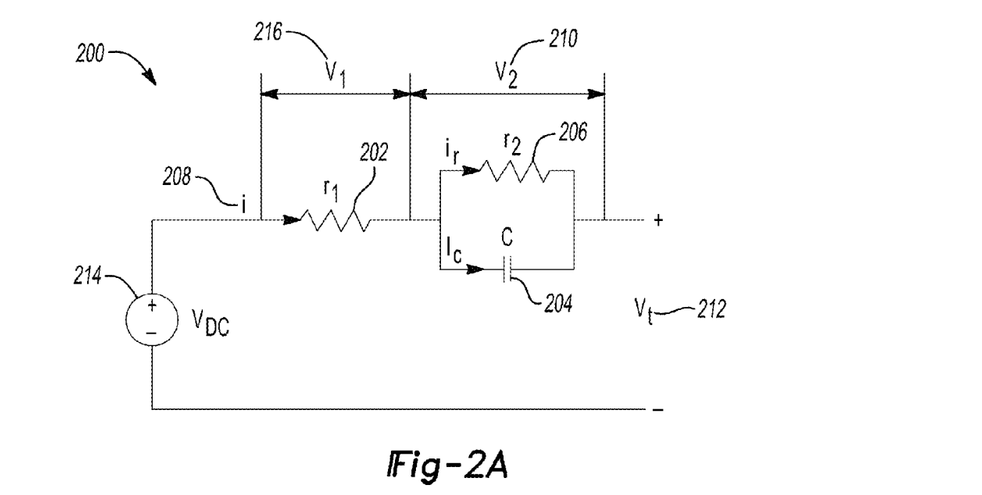
FIG. 2A is a schematic diagram of an equivalent circuit model of a battery.

FIG. 2A is a schematic of a simple equivalent circuit to model a battery. The circuit may model a battery including a battery pack and/or one or more battery cells. The simple equivalent circuit model 200 includes, in this example, a Randles Circuit Model. The Randles circuit (e.g., an RC circuit) consists of an active electrolyte resistance $r_1$ 202, in series with the parallel capacitance C 204, and an active charge transfer resistance $r_2$ 206. The Randles circuit allows the measurement of $v_t$ 212 terminal voltage, $v_{DC}$ 214 battery open circuit voltage, $v_1$ 216 internal battery voltage, and $v_2$ 210 the voltage of the R-C circuit. The Randles circuit may be implemented in a HEV battery management system to provide predictive computations for one or more battery parameters.

The HEV battery management system may implement the Randles Circuit Model to receive battery measurements for calculation of the electrochemical impedance and to estimate the battery parameters based on the impedance. The estimated battery parameters may include fluctuating trajectories which increase when the vehicle is in certain system modes including charging mode, sustaining mode, or depleting mode. These battery parameters tend to be sensitive to internal and external noises and environmental conditions when using a Randles circuit and/or other RC circuit configurations to estimate these parameters.

A system may receive the battery measurements to calculate battery power capability using a model parameter estimation that may include an average sense of effective battery internal resistance estimation during vehicle operation (e.g., real time operation). Battery power capability is affected by the impedance of the battery pack and its correlating dynamics. The battery model parameter estimation method may include battery measurement in the vehicle to obtain the electrochemical impedance with the use of Fast Fourier Transform and other calculations/algorithms described in further detail below to calculate battery power capability. The power capability of a battery may be determined by internal states and may be inferred by only using external system outputs. The calculations may be improved and the estimated parameter(s) may be less sensitive to the noise(s) by applying the Fast Fourier Transform to the battery measurements.

A battery management system may be based on the implementation of a Randles Circuit Model to provide enough computation speed manageable for the battery management system without introducing additional hardware and/or increasing the system complexity. The equivalent circuit model 200 may allow the calculation of predictive battery system parameters including impedance of the battery pack, internal resistance, and its correlating dynamics.

The implementation of one or more offline tests including EIS provides battery system characterization over wide frequency ranges. The implementation of EIS may require long development timing for an application and additional hardware during the development of the HEV battery pack. Having a HEV with battery power capability prediction in real-time during vehicle operation is beneficial to the battery management system to further prevent battery damage and failure modes caused by over-charging and over-discharging that may not be captured using offline development tests.

The characterization of the battery system may be calculated using a simplified approach with the use of one or more equivalent circuits for direct battery measurements in a HEV. The system may measure the battery current inputs and battery terminal voltage with the use of one or more RC circuits (e.g., Randle circuit). The measurement values may be recorded, calculated, and stored in one or more control modules in the vehicle computing system including the battery energy control module.

The offline method to calibrate the battery pack may not include the use of the Fast Fourier Transform since the test instrumentation may include a tuning feature to determine battery impedance from the calculated input current frequency. The vehicle battery measurement method may implement the Fast Fourier Transform such that it is applied to both current inputs and battery voltage with the use of the equation for continuous measurement as followed:

$$F(j\omega) = \int_0^\infty f(t)e^{-j\omega t}dt \tag{1}$$

Implementing the Fast Fourier transform in a continuous form allows the battery electrochemical impedance to be computed as follows:

$$Z(j\omega) = \frac{F[e(t)]}{F[i(t)]} = \frac{E(j\omega)}{I(j\omega)} \tag{2}$$

where $e(t)=v_t(t)-v_{OC}(t)$ is a battery voltage response, $i(t)$ is battery current input, and $Z(j\omega)$ is a battery electrochemical impedance.

The Fast Fourier Transform in a discrete form may also be applied and implemented in the vehicle battery measurement method as follows:

$$E(k) = \sum_{l=1}^{N} e(l)\omega_N^{(l-1)(k-1)} \quad (3)$$

$$I(k) = \sum_{l=1}^{N} i(l)\omega_N^{(l-1)(k-1)} \quad (4)$$

where E(k) is a Fast Fourier Transformed voltage, I(k) is a Fast Fourier Transformed current, e(l) is the $l^{th}$ data of the measured battery voltage data within the moving window (i.e., a receding horizon window), i(l) is the $l^{th}$ data of the measured battery current data within the moving window, N is a predetermined size of the receding horizon window (i.e., moving window) to capture data, $\omega_N = e^{(-2\pi)/N}$ is determined by the number of data points in the Fast Fourier Transform, k is an integer defining the frequency of the Fast Fourier Transformed signals, and l is the $l^{th}$ element of the data received within the moving window.

Implementing the Fast Fourier Transform in a discrete form allows the battery electrochemical impedance to be computed as follows:

$$Z(k) = \frac{E(k)}{I(k)} \quad (5)$$

where Z(k) is a Fast Fourier Transformed battery electrochemical impedance calculated from equation (3) and equation (4). The one or more controllers in the vehicle computing system may output an electrical impedance of the one or more battery cells for a sliding window time period. The time period may be based on the Fast Fourier Transformed electrical impedance distribution.

The system may output an average internal resistance of the cell for the time period based on an absolute magnitude of a real component of a mean electrical impedance of the cell for the time period if an absolute magnitude of a ratio of an imaginary component of the mean electrical impedance and the real component is less than or equal to a predetermined value defined by the implementation of the following equations:

$$(|IM(Z_{mean})/Re(Z_{mean})|) \leq criteria \quad (6a)$$

$$R_{int,avg} = |Re(Z_{mean})| \quad (6b)$$

where $Im(Z_{mean})$ is an imaginary part of the average electrical impedance for the cell and $Re(Z_{mean})$ is a real part of the average battery impedance within the time window/receding horizon window, and $R_{int,avg}$ is the average battery impedance within the time window/receding horizon window.

The system may output an average internal resistance of the cell for the time period as a product of a correction factor and the absolute magnitude of the real component if the absolute magnitude of the quotient is greater than the predetermined value defined by the implementation of the following equations:

$$(|Im(Z_{mean})/Re(Z_{mean})|) > criteria \quad (7a)$$

$$R_{int,avg} = a|Re(Z_{mean})| \quad (7b)$$

where a is a correction factor and will be discussed in further detail below. Based on the output of the average internal resistance calculation, the system may predict one or more battery parameters to enable the proper control of the battery pack.

The system may determine frequency responses of the battery pack by monitoring the equivalent circuit model 200. The system may calculate the battery current limit during a discharge event using the following equation:

$$i(t_d, v_{min}) = \frac{v_{OC} - v_{min} - v_2 e^{-t_d/(r_2 c)}}{r_1 + r_2(1 - e^{-t_d/(r_2 c)})} \cong \frac{v_{OC} - v_{min}}{Re_{int,avg}} \quad (8a)$$

where $v_{OC}$ 214 is the battery open circuit voltage as a function of battery State-of-Charge (SOC) and temperature, $r_1$ 202 is internal battery resistance, $r_2$ 206 is a resistance term of the charge transfer impedance, $v_2$ is the voltage of the RC circuit, and $t_d$ is a discharge time duration to calculate the battery current limit. The battery current limit may be expressed based on the averaged internal resistance in equation (8a). The system may calculate the battery current limit during a charge event using the following equation:

$$i(t_d, v_{max}) \cong \frac{v_{OC} - v_{max}}{Re_{int,avg}} \quad (8b)$$

where $v_{OC}$ 214 is the battery open circuit voltage and $t_d$ is a charge time duration. The system may calculate the battery instantaneous power capabilities during a charge event using the following equation:

$$P_{lim} = \left|\frac{v_{OC} - v_{max}}{Re_{int,avg}}\right| v_{max} \quad (9a)$$

where $P_{lim}$ is the power capability and $v_{max}$ is the maximum voltage. The system may calculate the battery instantaneous power capabilities during a discharge event using the following equation:

$$P_{lim} = \left|\frac{v_{OC} - v_{min}}{Re_{int,avg}}\right| v_{min} \quad (9b)$$

where $P_{lim}$ is the power capability and $v_{min}$ is the minimum voltage. The one or more control modules in the vehicle computing system may calculate the i 208 charge current needed to reach $v_{max}$ maximum voltage allowed of the battery pack using the following equation:

$$i(t_d, v_{max}) = \frac{v_{OC} - v_{max} - v_2 e^{-t_d/(r_2 c)}}{r_1 + r_2(1 - e^{-t_d/(r_2 c)})} \quad (10)$$

The one or more control modules in the vehicle computing system may calculate the final current limit as the maximum of the charge current limit and the system current limit of the battery pack based on the following equation:

$$i_{min} = \max(i(t_d, v_{max}), i_{chlim}) \quad (11)$$

where $i_{chlim}$ is the system current limit, $v_{max}$ is the maximum voltage, and $i_{min}$ is the final current limit as the maximum of the charge current limit.

The one or more control modules in the vehicle computing system may calculate the base charge power capability using the final current limit multiplied by the expected voltage for the final current limited to a one second charge by implementing the following equation:

$$P_{cap\_ch}(t_d) = |i_{min}|\{v_{OC} - i_{min}[r_1 + r_2(1 - e^{-t_d/(r_2 c)})] - v_v e^{-t_d/(r_2 c)}\} \quad (12)$$

where $i_{min}$ is the final current limit, $v_{OC}$ 214 is the battery open circuit voltage as a function of battery SOC and temperature, $r_1$ 202 is internal battery resistance, $r_2$ 206 is a resistance term of the charge transfer impedance, $v_2$ is the voltage of the RC circuit, and $t_d$ is a discharge time duration to calculate the battery current limit.

Figure 2B:
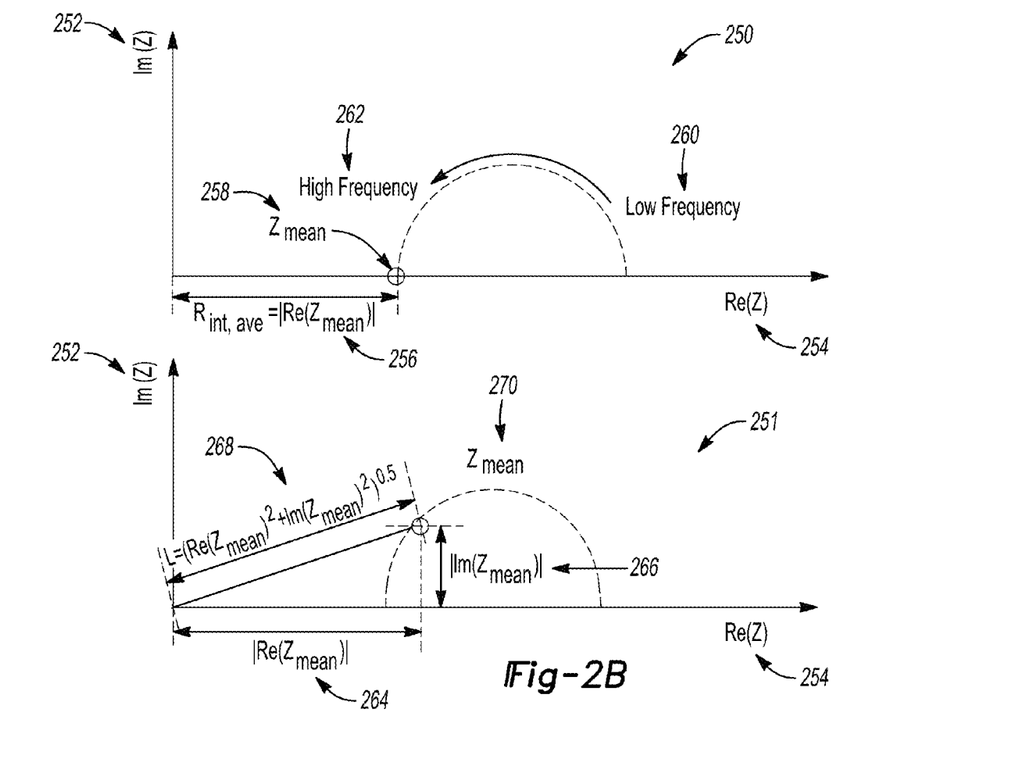
FIG. 2B are graphs illustrating a calculation of an average internal resistance of a battery cell.

FIG. 2B are diagrams illustrating a battery management system calculation of an average internal resistance of a battery cell. The horizontal axis 254 of each graph 250, 251 represents a real part of the average battery impedance within the time window/receding horizon window. The vertical axis 252 of each graph represents an imaginary part of the average electrical impedance for the cell.

The upper graph 250 in FIG. 2B is a diagram of the average internal resistance of the one or more cells for the time period based on equation 6(a). If the ratio of an imaginary component of the mean electrical impedance and the real component is less than or equal to a predetermined value, the average internal resistance 256 of the cell for the time period is set to an absolute magnitude of a real component of a mean electrical impedance 258 of the cell for the time period. If the ratio is less than the predetermined value, the average internal resistance relies on the high frequency 262 component of the electric impedance of the cell. The system may have to implement a correction factor if it includes the low frequency 260 component of the electric impedance of the cell.

For example, the lower graph 251 in FIG. 2B displays that the average internal resistance of the cell for the time period may be a product of a correction factor and the absolute magnitude of the real component 264 if the absolute magnitude of the ratio is greater than the predetermined value. Therefore, the system may have to calculate the average internal resistance of the battery pack and/or cell by implementing equation (7b). The correction factor a in equation (7b) may be determined based on one or more equations including, but not limited to, equation 268:

$$a = L/|Re(Z_{mean})| = (Re(Z_{mean})^2 + Im(Z_{mean})^2)^{0.5}/|Re(Z_{mean})| \quad (13)$$

which means the averaged internal resistance 264 takes account of the imaginary term 266 in the case that the imaginary term is not negligible to determine the mean electrical impedance 270.

During a calibration process of the battery system, the criteria used to determine the average internal resistance of the cell for the time period in equations (6a) and (7a) is calibrated to a defined value based on the characteristics of the battery pack and system. The criteria is based on the predefined value configured during calibration and is applied to compare whether the ratio of the imaginary component mean electrical impedance and the real component electrical impedance in equations (6a) and (7a) is the system output for the average internal resistance of the cell. For example, if a magnitude of the mean electrical impedance 268 is 1.1 times the mean electrical impedance of the real component 264, then the predefined value may be calibrated to 0.46. In another example, if a magnitude of the mean electrical impedance 268 is 1.05 times the mean electrical impedance of the real component 264, then the predetermined value may be calibrated to 0.32. The predetermined value may have a calibratable range including, but not limited to, 0.1 to 0.5. The calibratable range for the predefined value may be calibrated based on several factors including battery size, temperature, SOC, and/or other battery parameters that are related to performance of the system.

Figure 3:
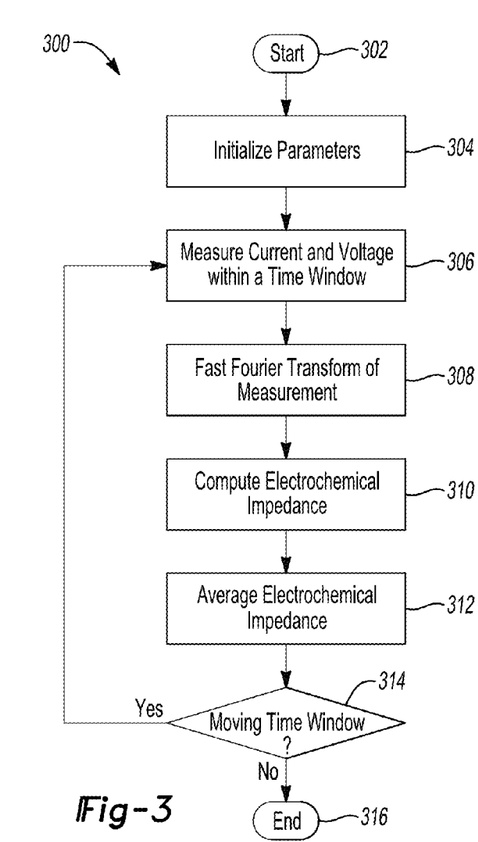
FIG. 3 is a flow chart of an algorithm for identifying one or more battery parameters used in a battery management method.

FIG. 3 is a flow chart of an algorithm for identifying one or more battery parameters used in a battery management method. The method is implemented using software code contained within the vehicle control module, according to one or more embodiments. In other embodiments, the method 300 is implemented in other vehicle controllers, or distributed amongst multiple vehicle controllers.

Referring again to FIG. 3, the vehicle and its components illustrated in FIG. 1 and FIG. 2 are referenced throughout the discussion of the method to facilitate understanding of various aspects of the present disclosure. The method of controlling the battery parameter prediction in the hybrid electric vehicle may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the flowchart diagram 300 appear to occur in a chronological sequence, at least some of the steps may occur in a different order, and some steps may be performed concurrently or not at all.

At step 302, during a key-on event which allows the vehicle to be powered on, the vehicle computing system may begin powering up the one or more modules. The powering up of the one or more modules may cause variables related to the battery management system to initialize before enabling one or more algorithms used to control the battery at step 304.

The dynamics of a battery cell at rest during non-operation of the vehicle is a self-discharge or charge depletion state, and before enabling the algorithms at a key-on event the parameters should be initialized. For example, the battery management method may initialize several variables including, but not limited to, the battery terminal voltage, current limits, and/or other battery related parameters.

At 306, the system may receive the battery voltage outputs and current inputs using several methods including the use of one or more RC circuits. Once the system has received the battery voltage responses and current measurements, the system may apply the Fast Fourier Transform to the current inputs and voltage responses to calculate an effective electrochemical impedance of the battery from the measured information during battery operation at step 308.

At step 310, the application of the Fast Fourier transform enables the system to compute electrochemical impedance based on the received current inputs and voltage responses of the battery system. The system may calculate an average internal battery impedance using the Fast Fourier Transform based on measured battery parameters in a given time frame at step 312.

At step 314, the average impedance may continue to be calculated based on the moving window timeframe of the received battery parameters. The moving window timeframe allows for new data to be entered into the calculation while removing data that is no longer in the sliding time frame window. The sliding time frame window is illustrated and explained in more detail in FIG. 4. If the system detects a key-off event, the system may end the one or more algorithms used to manage the battery pack and/or the one or more battery cells at step 316. The vehicle computing system may have a vehicle key-off mode to allow the system to store one or more parameters in nonvolatile memory such that these parameters may be used by the system for the next key-on event.

Figure 4:
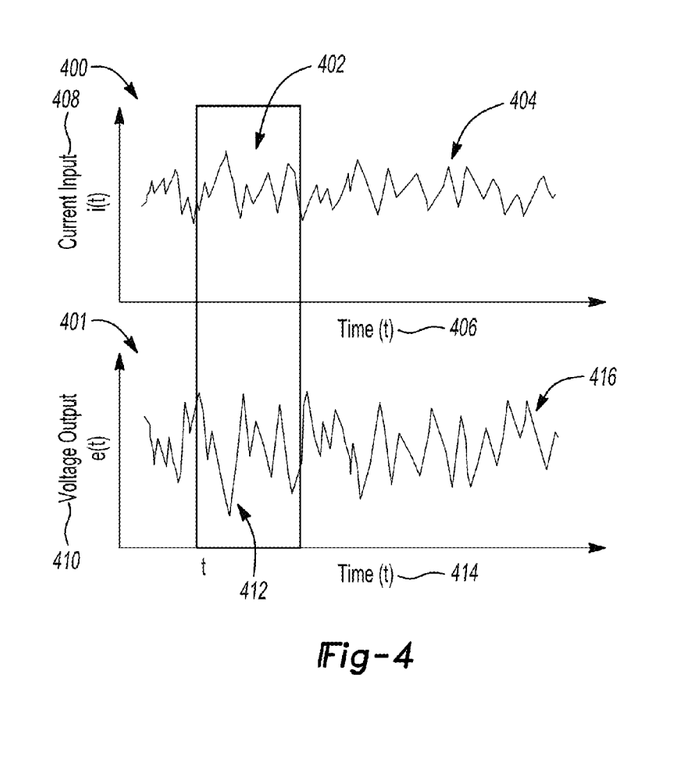
FIG. 4 are graphs displaying an input current profile and an output voltage profile to identify battery parameters in an equivalent circuit model.

FIG. 4 are graphs displaying a battery current input and a voltage output measured by a battery management system. The graphs display a battery input current profile 404, a battery voltage output profile 416, and a window 402 to measure and receive the battery current and voltage data. The battery input current profile graph 400 displays the battery input current by having an x-axis representing time 406 and a y-axis representing current 408. The battery voltage output profile graph 401 displays the battery voltage output by having an x-axis representing time 414 and a y-axis representing voltage 410.

The battery current and voltage data may be received by the one or more control modules to calculate electrochemical impedance of a battery using the Fast Fourier Transform. A window 402 continuously moves to get an updated battery current input and battery voltage output as the system is being operated. The oldest battery current input and battery voltage output data are abandoned, thus the total amount of data in the window is maintained 402. For example, the previous data is replaced with new data as it is received by the one or more control modules since the window size is fixed and the amount of data in the window is the same.

Figure 5:
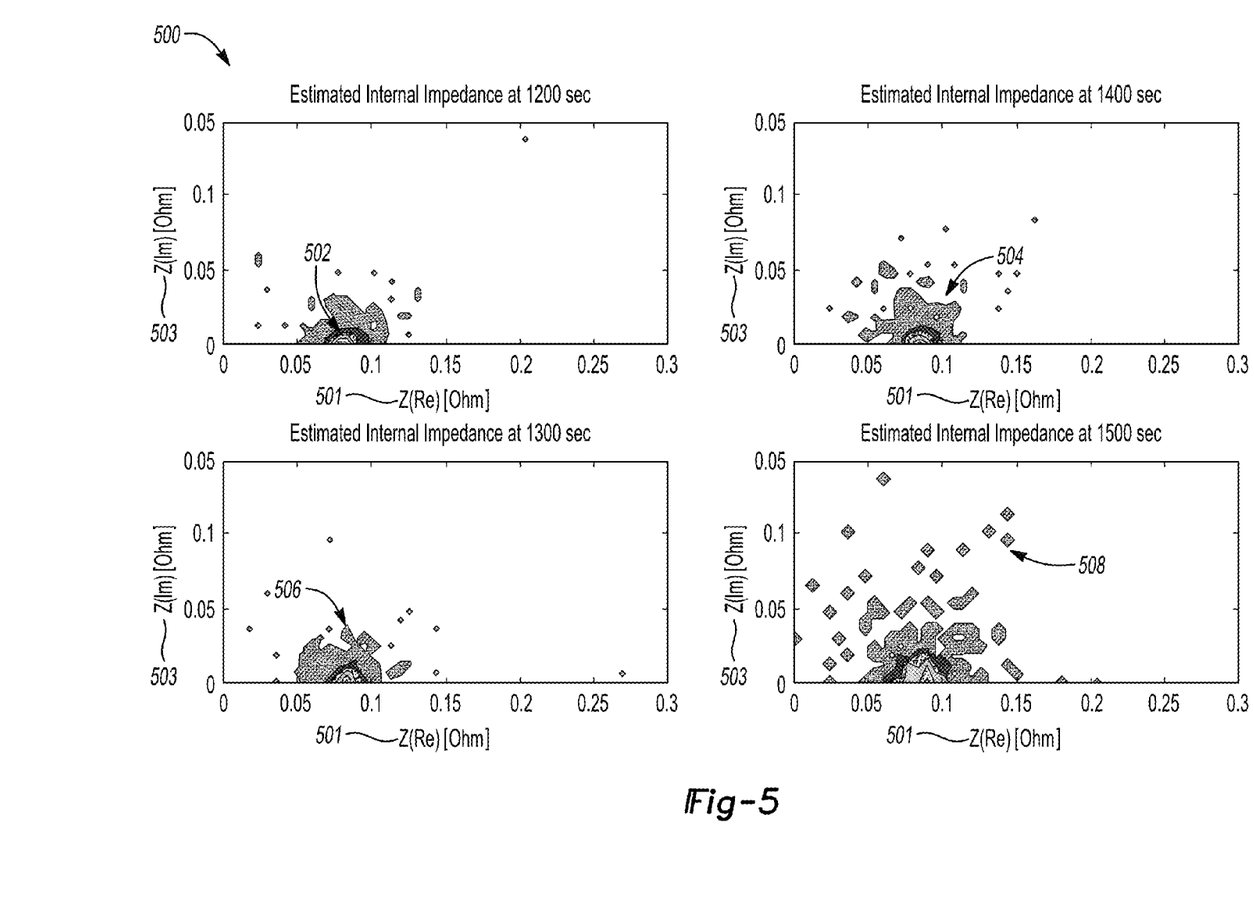
FIG. 5 are graphs displaying estimated internal impedance distributions of a battery computed by Fast Fourier Transform of the input current profile and output voltage profiles within a sliding window at each time step.

FIG. 5 are graphs displaying estimated internal impedance distributions of a battery at each interval of calculated electrochemical impedance. Averaged electrochemical impedance may be calculated to average the impedance distributions as shown in the graphs 500. The horizontal axis 501 of each graph 500 represents a real part of estimated internal impedance of a battery. The vertical axis 503 of each graph represents an imaginary part of estimated internal impedance of a battery. A contour in each graph represents the probability of the estimated internal impedance. A higher probability calculation is depicted in the bottom center of the contour as shown in data point 502, and a lower probability calculation is depicted on the outer edge of the contour as shown in data points 504, 506, 508.

Figure 6:
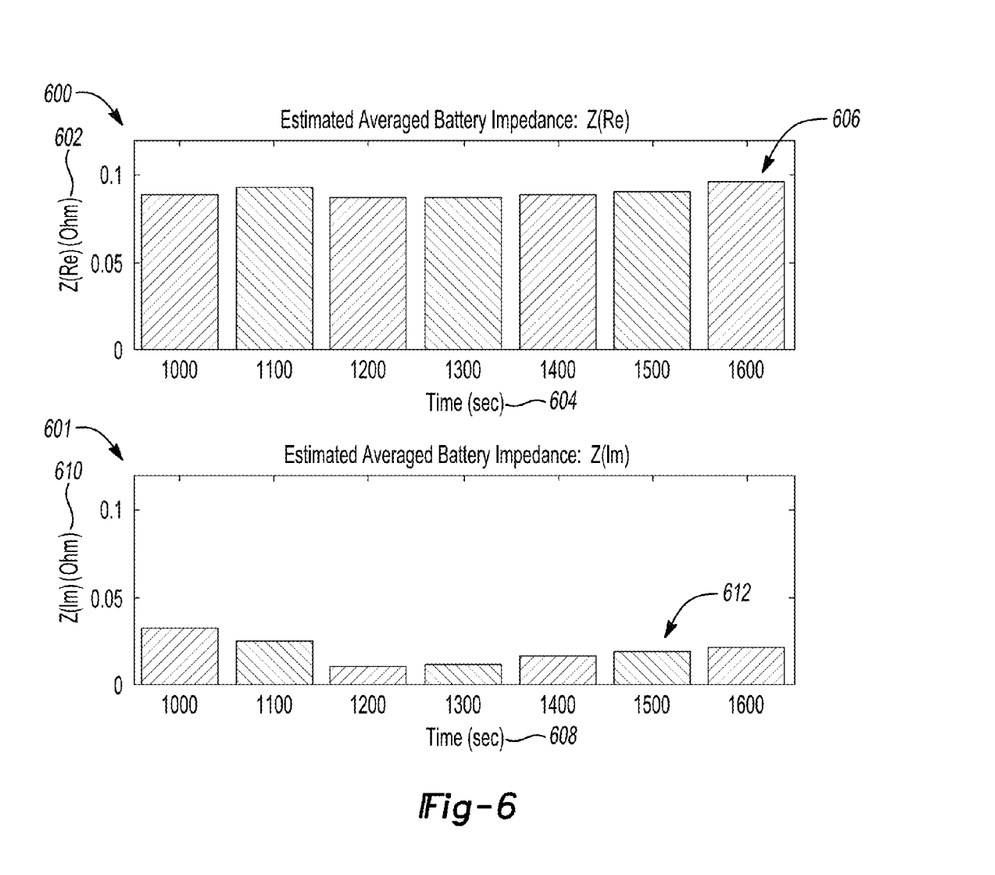
FIG. 6 are charts displaying estimated battery electrochemical impedance computed by averaging the internal impedance distribution at each time step.

FIG. 6 are charts displaying estimated battery electrochemical impedance under a charge sustaining mode of a hybrid-electric vehicle. The upper chart 600 displays a real part of the $Re(Z_{mean})$ averaged electrochemical impedance 606 at each interval by having an x-axis representing time 604 and a y-axis representing ohms 602. The lower chart 601 displays an $Im(Z_{mean})$ imaginary mean, part of the averaged electrochemical impedance 612 at each interval by having an x-axis representing time 608 and a y-axis representing ohms 610. If the imaginary part of the averaged electrochemical impedance 612 is less than a calibratable criteria, $(|Im(Z_{mean})/Re(Z_{mean})|)<=$criteria, the averaged internal impedance is calculated by equation (6a).

If the imaginary part of the averaged electrochemical impedance 612 is greater than a calibratable criteria, $(|Im(Z_{mean})/Re(Z_{mean})|)>$criteria, the averaged internal impedance is calculated by equation (7a). The correction factor a in equation (7a) may be determined with various approaches. For example, one possible approach is to compute the correction factor based on $(Re(Z_{mean})^2+Im(Z_{mean})^2)^{0.5}/|Re(Z_{mean})|$, which means the averaged internal resistance takes account of the imaginary term in the case that the imaginary term is not negligible. Additional tuning parameter(s) could modify this expression.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid powertrain system comprising:
a controller programmed to control operation of a battery according to a mean electrical impedance (MEI) and an average internal resistance each corresponding to a sliding window time period and respectively derived from a quotient of FFTs of battery voltage output and battery current input, and a real component magnitude of the MEI if a ratio of imaginary and real components of the MEI is less than a predetermined value.

2. The hybrid powertrain system of claim 1, wherein the average internal resistance is derived from a product of a correction factor and the real component magnitude of the MEI if the ratio of imaginary and real components of the MEI is greater than the predetermined value.

3. The hybrid powertrain system of claim 2, wherein the controller is further programmed to output a power available for the sliding window time period based on the average internal resistance.

4. The hybrid powertrain system of claim 2, wherein the predetermined value is approximately 0.45.

5. The hybrid powertrain system of claim 2, wherein the correction factor is proportional to a ratio of the MEI and the real component magnitude of the MEI.

6. A hybrid powertrain system comprising:
a controller programmed to output a mean electrical impedance of a traction battery for a sliding window time period based on a quotient of a Fast Fourier Transform (FFT) of voltage output by the battery and a FFT of current input to the battery,
output an average internal resistance of the battery for the time period based on a magnitude of a real component of the mean electrical impedance if a magnitude of a ratio of an imaginary component of the mean electrical impedance and the real component is less than or equal to a predetermined value,
output an average internal resistance of the battery for the time period based on a product of a correction factor and the magnitude of the real component if the magnitude of the ratio is greater than the predetermined value, and
control operation of the battery according to the average internal resistance.

7. The hybrid powertrain system of claim 6, wherein the correction factor is proportional to a ratio of a magnitude of the mean electrical impedance and the real component.

8. The hybrid powertrain system of claim 6, wherein the controller is further programmed to output a maximum discharge power available for the time period based on the average internal resistance.

9. The hybrid powertrain system of claim 6, wherein the controller is further programmed to output a maximum charge power available for the time period based on the average internal resistance.

* * * * *